June 24, 1924.
E. G. CARR
1,499,150
PROCESS FOR CONSTRUCTING MONOLITHS
Filed March 20, 1920  2 Sheets-Sheet 1
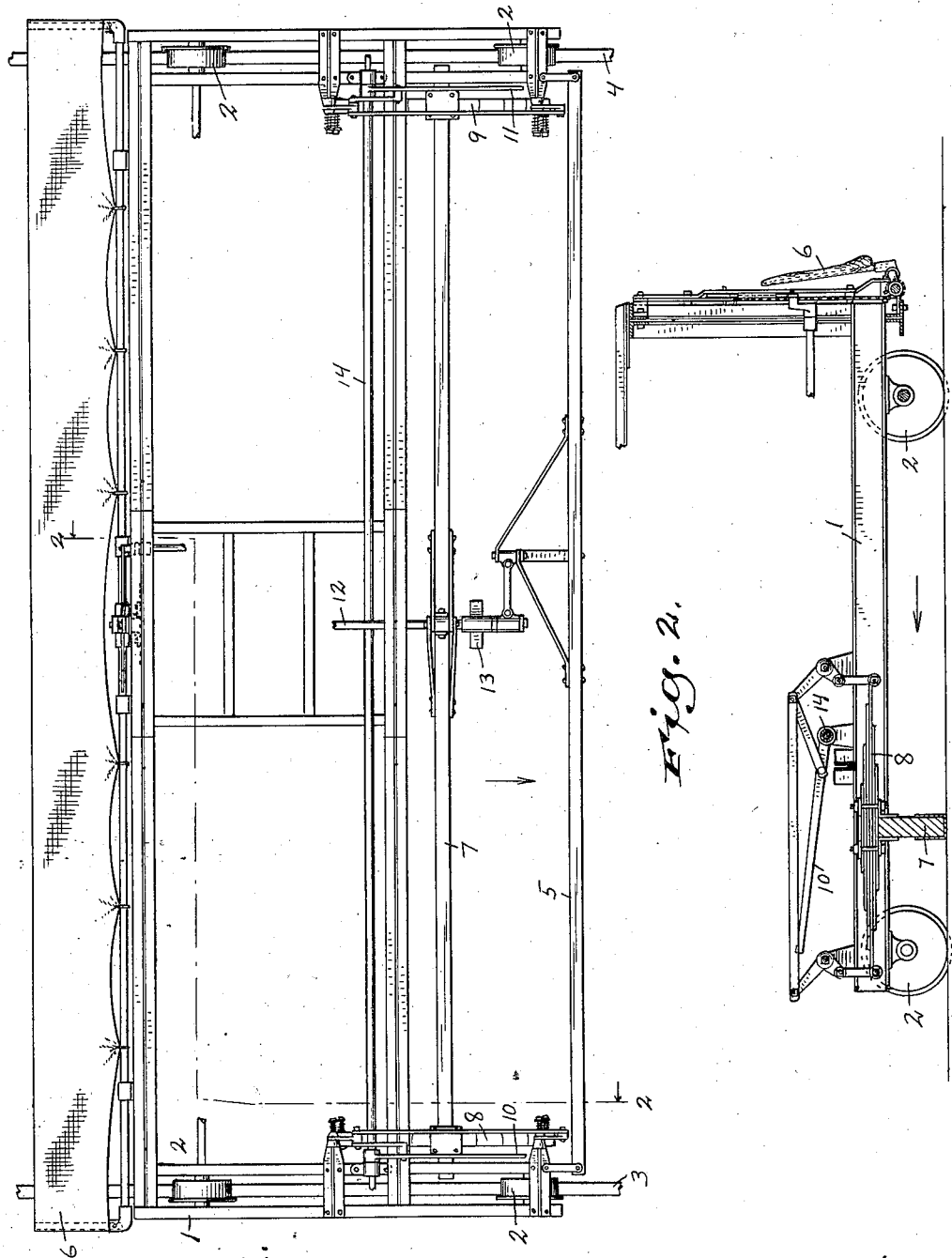

June 24, 1924.

E. G. CARR

PROCESS FOR CONSTRUCTING MONOLITHS

Filed March 20, 1920    2 Sheets-Sheet 2

1,499,150

Patented June 24, 1924.

1,499,150

UNITED STATES PATENT OFFICE.

EDWARD G. CARR, OF SHOREWOOD, WISCONSIN.

PROCESS FOR CONSTRUCTING MONOLITHS.

Application filed March 20, 1920. Serial No. 367,303.

*To all whom it may concern:*

Be it known that I, EDWARD G. CARR, a citizen of the United States, residing at Shorewood, in the county of Milwaukee and State of Wisconsin, have invented certain new and useful Improvements in Processes for Constructing Monoliths, of which the following is a specification, reference being had to the accompanying drawing, forming a part thereof.

This invention relates to a process for constructing so-called monoliths for roads and other purposes in which a course, foundation or backing of concrete is faced with brick or stone, and the object of the invention is to improve the process for constructing monoliths in the manner to be hereinafter described and claimed.

The process heretofore employed for the purpose, so far as I am aware, included the preparation of a course of concrete for a foundation or backing. The concrete was then permitted to set or harden and after it was sufficiently hard cement mortar, or grout, was applied to its exposed surface to cement the facing material to the course of concrete. The objections to the process were that too much time was necessary to complete the work, and the bonding of the facing to the course of concrete was uncertain and unreliable.

In my process I eliminate the preliminary setting or hardening of the course of concrete and I prepare a cement mortar bed with the aggregate, crushed rock for example, compactly arranged to form concrete and covered with a layer of cement mortar to which the facing is applied. The cement mortar can then be forced into the interstices between the elements of the facing and the entire mass of cement mortar allowed to set or harden. In this manner the work is completed without interruption and there results a perfect bonding of the several constituents of the mass.

My process can be carried out in several ways but the most reliable and most inexpensive way is to use one of my so-called concrete road machines to prepare the cement mortar bed and to force the cement mortar into the interstices between the elements of the facing.

Figure 5:
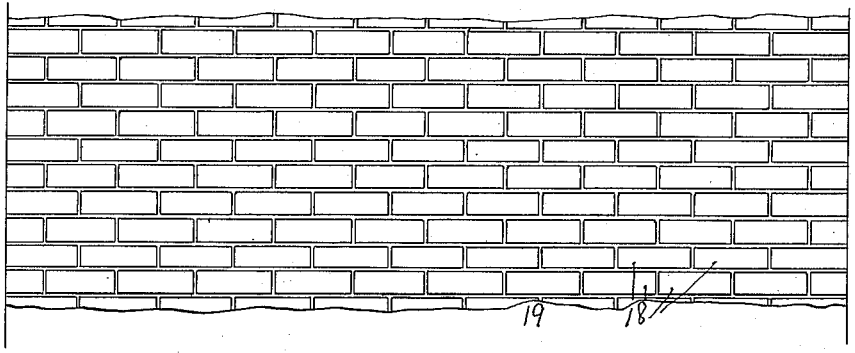
Figure 3:
Figure 4:
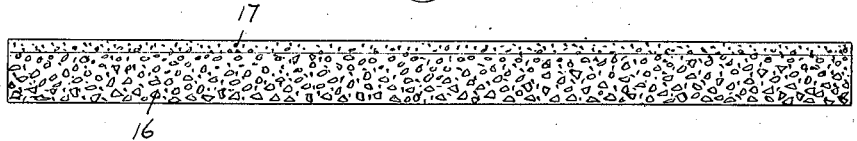
Figure 6:
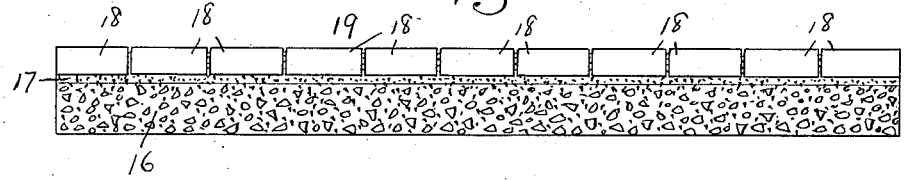

Referring to the drawings which accompany this specification and form a part hereof, Fig. 1 is a plan view of parts of my concrete road machine which is in extensive use throughout the United States and which is more specifically illustrated and described in my co-pending application for Letters Patent of the United States, Serial Number 295,948, filed May 9, 1919; Fig. 2 is a sectional elevation of parts of the machine, the section being taken on the line 2—2 on Fig. 1, looking in the direction indicated by the arrows; Fig. 3 is a transverse, vertical section of a road mold with concrete dumped thereon; Fig. 4 is a transverse, vertical section of the road mold with the aggregate compactly arranged to form concrete and covered with a layer of cement mortar ready for the facing to be applied; Fig. 5 is a plan view of a piece of completed road; and Fig. 6 is a transverse, vertical section of the completed road.

Referring to the drawings, the reference numeral 1, designates a frame which is adapted to be propelled upon wheels 2 over forms or supports 3 and 4. The machine is provided at its front end with a striker 5 for levelling the concrete, and at its rear end with a float or finisher 6 for giving the final surfacing to the concrete. Fig. 1 illustrates the float or finisher 6 in its operative position, and Fig. 2 illustrates the float or finisher 6 swung up out of the way so that the machine can be moved backwardly.

A tamper 7 is connected with springs 8 and 9 and the springs 8 and 9 can be raised or lowered by a lever 10 or by a lever 11. The striker 5 and the tamper 7 are actuated by a shaft 12 provided with an eccentric weight 13. The shaft 12 is rotated by a motor, not shown, and the tamper 7 moves vertically and the striker 5 moves horizontally. The levers 10 and 11 are connected across the machine by a shaft 14 so that, the operator can raise or lower the springs 8 and 9, and the tamper 7, from either side of the machine.

As the machine advances, the striker 5 levels the concrete, the tamper 7 arranges the aggregate, crushed rock for example, compactly and with a substantially uniform surface covered with a layer of cement mortar ready for the facing to be applied. The concrete used should be of such consistency as to give the desired depth or thickness of cement mortar beyond the aggregate.

The concrete may be encountered by the machine as shown by Fig. 3 of the drawings, but the striker 5 will level it and the tamper 7 will arrange the aggregate compactly to form a course of concrete 16 with a layer of cement mortar 17 beyond the concrete. The elements 18 of the facing 19 are then applied to the cement mortar 17 and the cement mortar is forced into the interstices between the said elements 18, which may be readily accomplished by placing the elements 18 in position clear across a road, for example, and running the machine over them, striking them with the tamper 7, as, by so doing, the course of concrete 16 is subjected to uniform pressure so that the aggregate will not be disturbed or displaced, and the tamper 7 will make and preserve a uniform surface for the facing.

What I claim is:

1. The process for constructing monoliths, which consists in preparing a cement mortar bed by compacting the aggregate within the mortar bed to form concrete, the mortar bed being of sufficient depth so that the concrete part thereof is covered with a layer of cement mortar, applying facing elements to the cement mortar and then forcing the cement mortar into the interstices between the facing elements, whereby the cement mortar throughout the aggregate and between the facing elements is homogeneous and of substantially the same age with regard to setting.

2. The process for constructing monoliths which consists in separating concrete into a layer of concrete with aggregate and a layer of cement mortar without aggregate, applying facing elements to the cement mortar, and then forcing the cement mortar into the interstices between the facing elements.

3. The process for constructing monoliths, which consists in preparing a cement mortar bed by compacting the aggregate within the mortar bed to form concrete, which is covered with a layer of cement mortar of the original cement mortar bed, applying facing elements to the cement mortar which overlies the concrete and subjecting the facing elements to uniform pressure, so as not to disturb or displace the aggregate, while forcing the cement mortar into the interstices between the facing elements.

In witness whereof I hereto affix my signature.

EDWARD G. CARR.